US012590210B2

(12) United States Patent
Sigmund et al.

(10) Patent No.: US 12,590,210 B2
(45) Date of Patent: Mar. 31, 2026

(54) WATER DISPERSIBLE COMPOSITE PARTICLES, METHODS OF MAKING, AND COATINGS

(71) Applicant: University of Florida Research Foundation, Inc., Gainesville, FL (US)

(72) Inventors: Wolfgang M. Sigmund, Gainesville, FL (US); Chieh-Ming Tsai, Gainesville, FL (US)

(73) Assignee: University of Florida Research Foundation, INC., Gainesville, FL (US)

( * ) Notice: Subject to any disclaimer, the term of this patent is extended or adjusted under 35 U.S.C. 154(b) by 838 days.

(21) Appl. No.: 17/785,508

(22) PCT Filed: Feb. 4, 2021

(86) PCT No.: PCT/US2021/016560
§ 371 (c)(1),
(2) Date: Jun. 15, 2022

(87) PCT Pub. No.: WO2021/162928
PCT Pub. Date: Aug. 19, 2021

(65) Prior Publication Data
US 2023/0036573 A1 Feb. 2, 2023

Related U.S. Application Data

(60) Provisional application No. 63/028,984, filed on May 22, 2020, provisional application No. 62/975,035, filed on Feb. 11, 2020.

(51) Int. Cl.
*C09D 7/62* (2018.01)
*C09D 5/02* (2006.01)
(Continued)

(52) U.S. Cl.
CPC .............. *C09D 7/62* (2018.01); *C09D 5/022* (2013.01); *C09D 5/14* (2013.01); *C09D 7/69* (2018.01)

(58) Field of Classification Search
CPC ... C08K 9/04; C08K 7/00; C08K 7/22; C08K 9/00; C08K 9/08; C09D 1/00;
(Continued)

(56) References Cited

U.S. PATENT DOCUMENTS

| | | |
|---|---|---|
| 2008/0103297 A1 | 5/2008 | Parthasarathy et al. |
| 2009/0078153 A1* | 3/2009 | Shchukin .................. C09C 3/10 |
| | | 106/14.44 |

(Continued)

FOREIGN PATENT DOCUMENTS

WO WO-2019070193 A1 * 4/2019 ........... C01B 33/157

OTHER PUBLICATIONS

JP6498817 (Year: 2019).*
ISR Mailed Apr. 23, 2021, Application No. PCT/US21/16560, Filed Apr. 2, 2021 pp. 1-16.

*Primary Examiner* — Shuangyi Abu Ali
(74) *Attorney, Agent, or Firm* — Thomas Horstemeyer LLP.

(57) ABSTRACT

The present disclosure provides for compositions including a composite particle, methods for making the composite particle, methods for using the composite particle, articles upon which the composite particle have been disposed, compositions including the composite particle and a fluid, devices including the composite particle and the fluid, and methods of using the composition including the composite particle and the fluid. Due to the structure and composition of the composite particle, the composite particle can be dispersed in an aqueous medium and then coated on a surface of an article, where upon evaporation of the aqueous
(Continued)

solution forms a hydrophobic or superhydrophobic coating on the surface of the article.

15 Claims, 1 Drawing Sheet

(51) Int. Cl.
    *C09D 5/14*           (2006.01)
    *C09D 7/40*           (2018.01)

(58) Field of Classification Search
    CPC ........ C09D 5/022; C09D 5/14; C09D 5/1681;
                  C09D 7/62; C09D 7/69; C09D 7/70
    See application file for complete search history.

(56) References Cited

U.S. PATENT DOCUMENTS

2014/0338906 A1   11/2014   Monastiriotis et al.
2017/0058190 A1    3/2017   Soane et al.
2017/0319458 A1   11/2017   Matsufuji et al.
2019/0249077 A1    8/2019   Monastiriotis et al.

* cited by examiner

WATER DISPERSIBLE COMPOSITE PARTICLES, METHODS OF MAKING, AND COATINGS

CLAIM OF PRIORITY TO RELATED APPLICATION

This application is the 35 U.S.C. § 371 national stage of PCT application having serial number PCT/US2021/016560, filed on Feb. 4, 2021. This PCT application having serial number PCT/US2021/016560 claims priority to co-pending U.S. provisional application entitled "Water Dispersible Superhydrophobic Nanoparticles and Coatings" having Ser. No. 62/975,035 filed on Feb. 11, 2020, which is entirely incorporated herein by reference. In addition, PCT application having serial number PCT/US2021/016560 claims priority to co-pending U.S. provisional application entitled "WATER DISPERSIBLE COMPOSITE PARTICLES, METHODS OF MAKING, AND COATINGS" having Ser. No. 63/028,984 filed on May 22, 2020, which is entirely incorporated herein by reference.

BACKGROUND

Hydrophobic and superhydrophobic surfaces can be advantageous in that such a surface can repel water, enhance water droplet evaporation, can repel oil, can be antimicrobial, and the like. As a result, there is a need develop materials that can be used to produce hydrophobic and superhydrophobic surfaces.

SUMMARY

The present disclosure provides for compositions including a composite particle, methods for making the composite particle, methods for using the composite particle, articles upon which the composite particle have been disposed, compositions including the composite particle and a fluid, devices including the composite particle and the fluid, and methods of using the composition including the composite particle and the fluid.

In an aspect, the present disclosure provides for a composition that includes a composite particle having a hydrophilic core, a first layer on the surface of the core and a second layer bonded to the first layer, wherein the first layer is a hydrophilic polymer and the second layer is a hydrophobic polymer, wherein a region is present within the first the first layer and the second layer is porous, between the first layer and the second layer is porous, or both.

In another aspect, the present disclosure provides for a composition including a fluid and a plurality of composite particles as defined above and herein, wherein under condition A, the plurality of composite particles are hydrophobic and are suspended in the fluid, wherein under condition B, the plurality of composite particles are hydrophilic and are dispersed in the fluid. In an aspect, condition B has the composition at a first pressure so that the composition is at a pressure less than 1 ATM and the plurality of composite particles are hydrophilic and are dispersed in the fluid, optionally wherein the first pressure is about 0.1 to 0.5 ATM. In another aspect, condition B has the composition at a second pressure so that the composition is at a pressure greater than 1 ATM and the plurality of composite particles are hydrophilic and are dispersed in the fluid, optionally wherein the second pressure is about 2 to 40 ATM.

In another aspect, the present disclosure provides for an article having a layer of the composition as described above and herein disposed on the surface, wherein the surface is superhydrophobic.

BRIEF DESCRIPTION OF THE DRAWINGS

Further aspects of the present disclosure will be more readily appreciated upon review of the detailed description of its various embodiments, described below, when taken in conjunction with the accompanying drawings.

DETAILED DESCRIPTION

Figure 1:
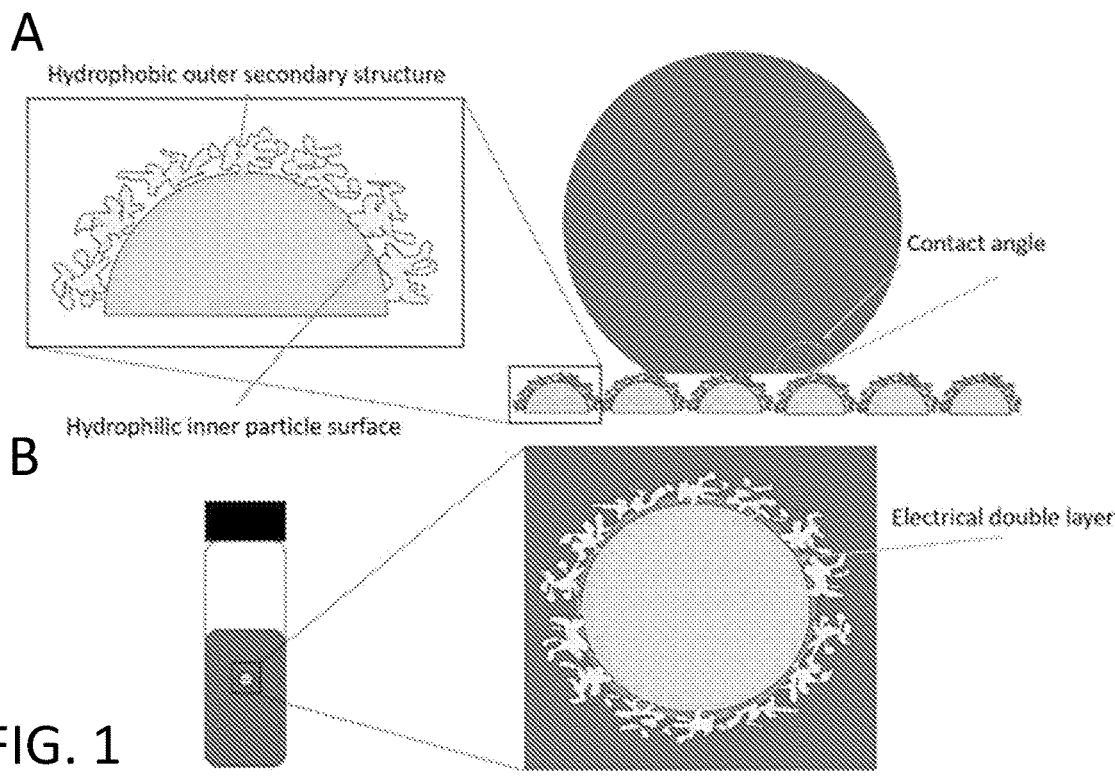
FIGS. 1A and 1B illustrates a sketch of (1A) water droplet on superhydrophobic Odin or dichotomous particles, (1B) dispersion of Odin particle in aqueous solution. Particles can be any size from nano to 100 microns.

This disclosure is not limited to particular embodiments described, and as such may, of course, vary. The terminology used herein serves the purpose of describing particular embodiments only, and is not intended to be limiting, since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method may be carried out in the order of events recited or in any other order that is logically possible.

Embodiments of the present disclosure will employ, unless otherwise indicated, techniques of chemistry, polymer chemistry, material science, and the like, which are within the skill of the art. Such techniques are explained fully in the literature.

Prior to describing the various embodiments, the following definitions are provided and should be used unless otherwise indicated.

Unless otherwise defined, all technical and scientific terms used herein have the same meaning as commonly understood by one of ordinary skill in the art of microbiology, molecular biology, medicinal chemistry, and/or organic chemistry. Although methods and materials similar or equivalent to those described herein can be used in the practice or testing of the present disclosure, suitable methods and materials are described herein.

As used in the specification and the appended claims, the singular forms "a," "an," and "the" may include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Discussion

The present disclosure provides for compositions including a composite particle (also referred to as "dichotomous composite particle"), methods for making the composite particle, methods for using the composite particle, articles upon which the composite particle have been disposed, compositions including the composite particle and a fluid, devices including the composite particle and the fluid, and methods of using the composition including the composite particle and the fluid. Due to the structure and composition of the composite particle, the composite particle can be dispersed in an aqueous medium and then coated on a surface of an article, where upon evaporation of the aqueous solution (e.g., drying), forms a hydrophobic or superhydrophobic coating on the surface of the article. The articles can include cloth, cardboard, wood, metal, drywall, other painted surfaces, plastic, pottery, rock, concrete, and other surfaces that are typically coated by paint.

In general, the composition includes a composite particle having a hydrophilic core and a first layer on the surface of the core and a second layer bonded to the first layer. The first layer comprises a hydrophilic polymer and the second layer comprises a hydrophobic polymer. One or more regions within the first layer and/or between the first layer and the second layer is porous (e.g., which can contain gas (e.g., air)). The composite particle, under certain conditions, is dispersible in water, and can produce a hydrophobic or a superhydrophobic characteristic on a surface upon application and drying on the surface. A superhydrophobic surface is a highly hydrophobic and difficult to wet, where the contact angle of a water droplet is greater than 150° and the roll off angle is less than 2°.

In an aspect, the composition includes an aqueous fluid and the plurality of composite particles. The composition can be processed so that the composite particles are dispersible in water. Upon application onto a surface of an article and drying (e.g., evaporation of the water), the composite particles form a layer having a hydrophobic or a superhydrophobic characteristic.

The hydrophilic core can be a solid core or a porous core having a hydrophilic surface. Regarding the porous core, porous means that the particle has open and closed pores that reduce its density. Porous particles may have about 50 vol % of solid and about 50 vol % air while they are still mechanically stable. A porosity of about (e.g., equal to and/or greater than 0) 0 vol % to about 50 vol % can be used. Pores can be regular or irregular in shape and come with a variety of sizes, with diameters typically not exceeding $\frac{1}{20}^{th}$ of the diameter of the particle core. In an aspect, the hydrophilic core is selected from the group consisting of: a hydrophilic ceramic (e.g., titania, ZnO, or silica) or a hydrophilic metal (e.g., gold, silver, copper), or materials having similar characteristics. The hydrophilic core can be of any shape such as spherical, polygonal, irregular, spongy (e.g., porous), dendritic, polygonal, rod-like and the like. The longest dimension (e.g., diameter, length, etc.) can be about 10 nm to 50 micrometer or preferably about 10 nm to 10 micrometers.

The composite particle can be of any shape such as spherical, polygonal, irregular, spongy (e.g., porous), dendritic, polygonal, rod-like and the like. The longest dimension (e.g., diameter, length, etc.) can be about 100 nm to 50 micrometer or preferably 100 nm to 100 micrometers.

In an aspect, the first layer chemical compound can be polyethyleneimine (PEI). The polyethyleneimine can have a molecular weight of about 10 KD to 100 KD. This first layer is adsorbed onto the surface of the core. Then a sol-gel chemical reaction is induced using tetraethyl oxysilane (TEOS). Polyethyleneimine acts as a catalyst and binder to assist in first forming silica particles and then bind them to the surface. In this way a porous inorganic sol gel silica layer is formed on top of the hydrophilic core. In the next step this layer is now hydrophobized using one or more of a variety of hydrophobizing agents. This turns the outer surface of this particle hydrophobic and given enough porosity exists in the first layer, it will be superhydrophobic. The average thickness of the finished first layer (e.g., PEI, sol-gel silica, hydrophobizing agent) can be about 10 nm to 50 micrometers. In an aspect, the thickness can be about % the longest dimension of the hydrophilic core.

In an aspect, the hydrophobic polymer of the second layer can be a fluorosilane, a long chemically bound fatty acid such as stearic acid, (e.g., with a number of carbon atoms from 14 to 40), hydrophobic polyurethane, polystyrene or similar, and a combination thereof. The fluorosilane can be heptadecafluoro-1,1,2,2-tetrahydrodecyl) trichlorosilane (HFTDTCS) and any subclasses of these.

The hydrophobization cannot penetrate into the core. This allows the composite particle to have two features that are counterpoints—it is hydrophilic in its core and hydrophobic on the outer surface. This can facilitate the use of superhydrophobic breakdown to wet the composite particle and induce charges on the surface that can enable dispersion in an aqueous solution. After applying the aqueous solution including the composite particles onto a surface, once dried the composite particles are hydrophobic or superhydrophobic so that the surface has hydrophobic or superhydrophobic properties. The combined pore channel area adds up to about 10% to 90%, or about 30% to 70%, about 40% to 60%, or about 50% of surface coverage of the core to allow for enough surface of the core to be charged for repulsion.

In regard to the composite particle, the longest dimension (e.g., diameter, length, etc.) can be about 100 nm to 500 micrometers or about 100 nm to 250 micrometers.

The term "disposed" or "attached" can include "bind" or "bound", which can refer to, but is not limited to, chemically bonded (e.g., covalently or ionically), biologically bonded, biochemically bonded, physically bonded, and/or otherwise associated with the material. In an embodiment, being bound can include, but is not limited to, a covalent bond, a non-covalent bond, an ionic bond, a chelated bond, as well as being bound through interactions such as, but not limited to, hydrophobic interactions, hydrophilic interactions, charge-charge interactions, π-π stacking interactions, combinations thereof, and like interactions. In an embodiment the composite particle can include one or more linker compounds so that so that the hydrophobic core can attach to the first layer and the first layer can include one or more linker compounds to that the second layer can bind with the first layer.

Having described the composite particles generally, additional details are now provided. Under atmospheric conditions and higher air pressures (about 1 ATM and above) in the presence of air, the composite particles are superhydrophobic, in that water does not penetrate the pore. However, a superhydrophobic structure has a limit to when it fails, i.e., the superhydrophobic breakdown. This can be induced by putting the composite particles in a pressure chamber in water while only limited amount of trapped air is present, triggering the dissolution of the surface trapped air into water and thus wetting the composite particle. By adjusting the pH such particles can now be dispersed with electric double layer repulsion combined with stirring or shear-mixing or ultrasound. A second method to achieve super-hydrophobic breakdown is to use ultrasound alone, where the ultrasound triggers dissolution of the surface air into water and the composite particles are wetted. Another method to achieve superhydrophobic breakdown is to apply vacuum, where the change in pressure triggers dissolution of the surface air into water and the composite particles are wetted. Once particles are in water and fully wetted the repulsive forces from the electric double layer will keep them dispersed. The dispersion stability can be calculated with the DLVO theory or extended DLVO theory. Further-more, polymers (e.g., poly-ethylene imine, poly acrylates and other water-soluble polyelectrolytes (cationic or anionic) with low molecular weight (under 50,000 Dalton, preferably under 10,000 Dalton and best under 5,000 Dal-ton) may be added to assist in dispersion to achieve either a mixed state of dispersion (electrosteric) or purely steric. In addition, nonionic polymers such as polyethylene glycol may also be used, i.e., acting purely steric.

The composite particles, under normal conditions, are hydrophobic due to the hydrophobic polymer in the second layer on the surface of the composite particle. However, the composite particles can be under a set of conditions or processed so that the composite particles can be dispersed in an aqueous fluid. In this regard, under condition A, the composite particles are hydrophobic and are not suspended in the fluid and while under condition B, the composite particles are hydrophilic and are dispersed in the fluid.

Typically, when the composite particles are made, they are under condition A and are floating on top of the aqueous fluid. In order to transition them into condition B, i.e., they are suspended (dispersed) in the fluid, the composite par-ticles together with the fluid are subjected to a change in pressure and/or to an application of ultrasound. In this regard, condition B can be that the composition is at a first pressure such as a pressure less than 1 ATM, the first pressure is about 0.1 to 0.5 ATM and the plurality of composite particles are hydrophilic and are dispersed in the fluid. Alternatively, condition B can be that the composition is at a second pressure with the composite particles floating on top of the fluid with only small amount of air in a pressure vessel, so that the composition can be compressed at a pressure greater than 1 ATM (e.g., about 2 ATM to 40 ATM) so that the plurality of composite particles are hydrophilic and are dispersed in the fluid. In addition, condition B can be that the composition has been subjected to ultrasound using either an ultrasonic bath or an ultrasonic horn with sound frequencies from 20 to 40 kHz (preferably 40 kHz). The ultrasound creates cavitation bubbles that dissolve the air trapped in the pores on the composite particle surface and furthermore pushes the air out of the fluid into the environ-ment and thus the plurality of composite particles are hydrophilic and are dispersed in the fluid. In an embodiment, condition B is a combination of a higher or lower pressure (as compared to 1 ATM) and has been subject to ultrasound and the plurality of composite particles are hydrophilic and are dispersed in the fluid. Once dispersed in the fluid, a chemical can be added to the composition or a condition can be changed so that the composite particles remain dispersed in the fluid until sprayed or applied in any other way.

While in some embodiments all or substantially all (about 95% or more) of the composite particles are dispersed in aqueous fluid, it is contemplated that only a portion of the composite particles are dispersed in the aqueous fluid. In this regard, the ratio of the plurality of composite particles that are hydrophobic and are suspended in the fluid as compared to the plurality of composite particles that are hydrophilic and are dispersed in the fluid is about 25:75 to about 75:25.

The present disclosure provides for articles having hydro-phobic or superhydrophobic surfaces. The surfaces having hydrophobic or superhydrophobic characteristics are the result of being treated with the composite particles. For example, the composite particles can be dispersed in an aqueous fluid is disposed (e.g., sprayed, poured, etc.) on the surface of the article and then allowed (e.g., naturally or expedited drying using equipment to accelerate the process) to dry. Once dried, the composite particles form a layer on the surface of the article having the hydrophobic or super-hydrophobic characteristic.

Having described aspects of the present disclosure, addi-tional features and details are not provided. FIGS. 1A and 1B illustrate the design of such particles. On top of a hydro-philic core particle is build a secondary structure with higher surface area that is also hydrophilic. This is followed by coating with a hydrophobizing agent (hydrophobic poly-mer). Due to the size of the pores, the outer part is more densely coated with the hydrophobizing agent than the surface on the core particle. This is due to limitations in diffusion caused by the pore size. This allows the particle to have two features that are counterpoints—it is hydrophilic on its core and hydrophobic on the outer part. This allows to use superhydrophobic breakdown to wet the particle and induce charges on the surface that may enable dispersion in water. On drying the superhydrophobic properties are recov-ered. The pore channel size and shape as well as the amount and type of applied hydrophobizing agent define the upper limits of the superhydrophobic breakdown. In this special example of Odin particle there is no heat treatment involved, i.e., all organic molecules such as the polyethene imine (PEI) used in the process to create the secondary surface structure are still present. It may be that this PEI compound is also contributing to the dispersibility in water in addition to the hydrophilic core.

Experiments

Figure 2:
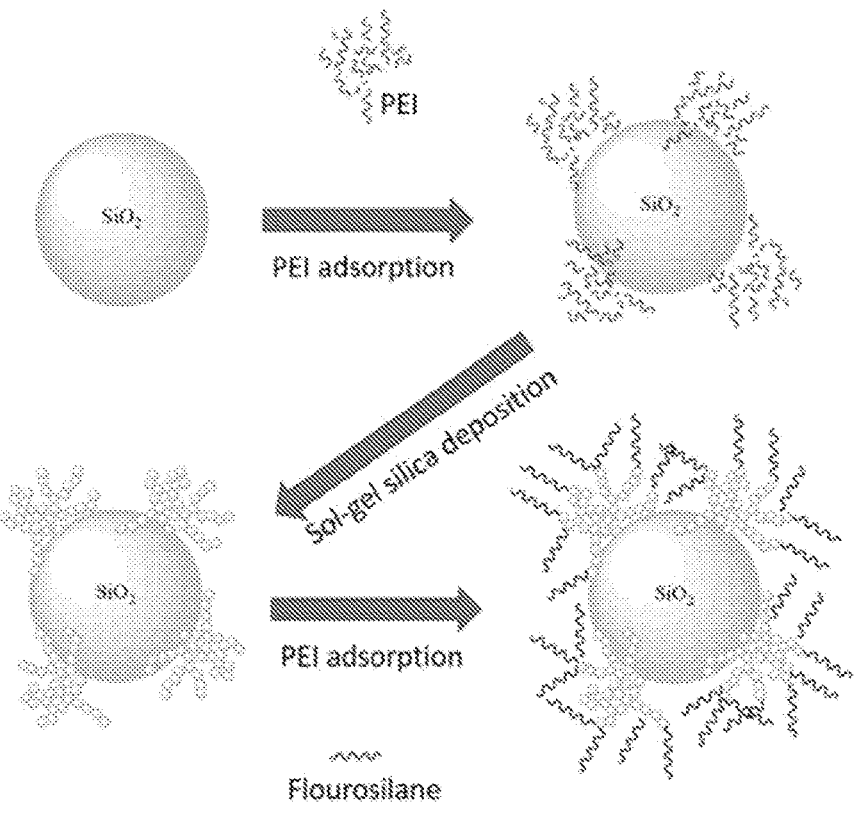
FIG. 2 is a schematic diagram of preparation of nanoparticles by PEI adsorption.

FIG. 2 outlines the process for the specific Odin particle. The process first adsorbs PEI to $SiO_2$ nanoparticles. Then a sol-gel deposition is triggered on the adsorbed PEI substrate to form a secondary nanostructure. Then the entire particle is coated with (heptadecafluoro-1,1,2,2-tetrahydrodecyl) trichlorosilane HFTDTCS fluoro silane. After mixing with FE4400 Lumiflon and deionized water, an aqueous disper-sion forms that can be turned into a superhydrophobic film by any coating technique.

Materials

Silica nanoparticles (100 nm, Aerosil OX50), polyethyl-eneimine (PEI, branched, MW: 70000, 30% solution in water, Alfa Aesar), tetraethyl orthosilicate (TEOS, 98%, ACROS), (heptadecafluoro-1,1,2,2-tetrahydrodecyl) trichlo-rosilane (HFTDTCS, Gelest), Lumiflon FE4400 fluoropo-lymer resin (53% water solution, Asahi), hydrochloric acid (HCl, 37% water solution, Aldrich), ethyl alcohol (95%, Fisher), chloroform (99.8%, Fisher), deionized water (DI water).

Preparation of Nanoparticles with Secondary Sol Gel Deposited Nanostructure

PEI Adsorption and Sol-Gel Silica Deposition

Spherical 100 nm $SiO_2$ particles are used as core. 1 g $SiO_2$ nanoparticles, 1 g polyethyleneimine solution and 1 mL HCl solution are added into 50 mL deionized water in 250 mL glass flask. After 1 hour magnetic stirring, 1.5 mL tetraethyl orthosilicate (TEOS) is gradually added to the dispersion. 24 hours later, the particles ($SP$—$SiO_2$) are centrifuged ($12857\times g$, 5 min) and washed with ethanol. Then the particles are dried in 70° C. in an oven for 1 day.

Fluorosilane Modification of the Nanoparticles 1 g of $SAP$-$SiO_2$/$SP$—$SiO_2$ nanoparticles are dispersed in 50 mL chloroform in 250 mL flask. And then 0.7 mL of (heptadecafluoro-1,1,2,2-tetrahydrodecyl) trichlorosilane (HFTDTCS) is added into the flask. After 24 hours, the fluorosilane modified particles ($FSAP$-$SiO_2$/$FSP$—$SiO_2$) are centrifuged and washed with ethanol. Then the particles are dried at 70° C. in an oven.

Preparation of Superhydrophobic Coating from Aqueous Dispersion

Different weight of $FSP$—$SiO_2$ nanoparticles are added with Lumiflon FE4400 water solution and 4 mL DI water. After ultrasonic dispersion (600 W, 24 hr), the dispersion (5 mL) is coated on the flat glass (about 26 mm×26 mm) by 100 rpm spin coating. After drying in room temperature/90° C. oven for 24 hrs, the nanocomposite coatings with different particle ratios form.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value. In addition, the phrase "about 'x' to 'y'" includes "about 'x' to about 'y'".

Many variations and modifications may be made to the above-described embodiments. All such modifications and variations are intended to be included herein within the scope of this disclosure and protected by the following claims.

The invention claimed is:

1. A composition, comprising a composite particle having a hydrophilic metal core, and having two layers, an inner layer on the surface of the hydrophilic core and an outer layer bonded to the inner layer, wherein the inner layer is made of a polyethyleneimine and the outer layer is a fluorosilane, wherein either a first porous region is present within the inner layer, a second porous region is present between the inner layer and the outer layer, or both.

2. The composition of claim 1, wherein the polyethyleneimine has a molecular weight of about 10 KD to 100 KD.

3. The composition of claim 1, wherein the fluorosilane is heptadecafluoro-1,1,2,2,-tetrahydrodecyl) trichlorosilane (HFTDTCS).

4. The composition of claim 1, wherein the hydrophilic metal is gold, silver, or copper.

5. The composition of claim 1, wherein the composite particle has a longest dimension of about 10 to 50 μm.

6. The composition of claim 1, wherein the first porous region, the second porous region, or both have a combined pore channel area that adds up to about 10% to 90% of surface coverage of the hydrophilic core.

7. The composition of claim 1, wherein the hydrophilic metal is silver or copper.

8. A composition, comprising a composite particle having a hydrophilic core, and having two layers, an inner layer on the surface of the hydrophilic core and an outer layer bonded to the inner layer, wherein the inner layer is made of a polyethyleneimine and the outer layer is a fluorosilane, wherein either a first porous region is present within the inner layer, a second porous region is present between the inner layer and the outer layer, or both, wherein the composition has a surface that is superhydrophobic having a contact angle between a water droplet and a surface is greater than 150° and a roll off angle is less than 2°.

9. The composition of claim 8, wherein the fluorosilane is heptadecafluoro-1, 1,2,2,-tetrahydrodecyl) trichlorosilane (HFTDTCS).

10. The composition of claim 8, wherein the hydrophilic core is a hydrophilic ceramic.

11. The composition of claim 10, wherein the hydrophilic ceramic is titania.

12. The composition of claim 10 wherein the hydrophilic ceramic is ZnO.

13. The composition of claim 8, wherein the hydrophilic core is a hydrophilic metal.

14. The composition of claim 12, wherein the hydrophilic metal is silver.

15. The composition of claim 12, wherein the hydrophilic metal is copper.

* * * * *